United States Patent
Nakajima

(10) Patent No.: US 10,415,843 B2
(45) Date of Patent: Sep. 17, 2019

(54) AIR INFORMATION MANAGEMENT APPARATUS

(71) Applicant: Panasonic Intellectual Property Management Co., Ltd., Osaka (JP)

(72) Inventor: Hirobumi Nakajima, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 92 days.

(21) Appl. No.: 15/511,855

(22) PCT Filed: Sep. 8, 2015

(86) PCT No.: PCT/JP2015/004549
§ 371 (c)(1),
(2) Date: Mar. 16, 2017

(87) PCT Pub. No.: WO2016/042735
PCT Pub. Date: Mar. 24, 2016

(65) Prior Publication Data
US 2017/0299217 A1    Oct. 19, 2017

(30) Foreign Application Priority Data

Sep. 19, 2014  (JP) ................ 2014-190887

(51) Int. Cl.
*F24F 11/72* (2018.01)
*F24F 11/52* (2018.01)
(Continued)

(52) U.S. Cl.
CPC .............. *F24F 11/72* (2018.01); *F24F 11/52* (2018.01); *G05B 19/042* (2013.01); *G06Q 30/06* (2013.01);
(Continued)

(58) Field of Classification Search
CPC ............................ G05B 15/02; H04L 12/2803
See application file for complete search history.

(56) References Cited

U.S. PATENT DOCUMENTS

| 7,956,719 B2 * | 6/2011 | Anderson, Jr. ........ G05B 15/02 340/3.51 |
| 2008/0167931 A1 * | 7/2008 | Gerstemeier .......... G06Q 10/06 705/7.22 |

(Continued)

FOREIGN PATENT DOCUMENTS

| JP | H11-258359 A | 9/1999 |
| JP | 2001-216375 A | 8/2001 |

(Continued)

OTHER PUBLICATIONS

Japanese Office Action issued in Application No. 2014-190887 dated May 8, 2018.

(Continued)

*Primary Examiner* — Ronald D Hartman, Jr.
(74) *Attorney, Agent, or Firm* — McDermott Will & Emery LLP

(57) ABSTRACT

An air information management apparatus includes: an obtainer that obtains an air state of a target area from a sensor installed in the target area or an area surrounding the target area; storage in which an air state record that is a record of the air state obtained by the obtainer is stored; an information processor that derives, from the air state record stored in the storage, statistical information on the air state measured for the target area during a predetermined period; and a display controller that causes the display apparatus to display, as information indicating an air environment in the target area, the statistical information derived by the information processor.

5 Claims, 8 Drawing Sheets

(51) Int. Cl.
    *G06Q 50/16*     (2012.01)
    *G05B 19/042*     (2006.01)
    *G06Q 30/06*     (2012.01)
    *F24F 110/10*     (2018.01)
    *F24F 110/20*     (2018.01)
    *F24F 110/50*     (2018.01)
    *F24F 140/60*     (2018.01)
    *F24F 130/10*     (2018.01)

(52) U.S. Cl.
    CPC .......... *G06Q 50/16* (2013.01); *F24F 2110/10* (2018.01); *F24F 2110/20* (2018.01); *F24F 2110/50* (2018.01); *F24F 2130/10* (2018.01); *F24F 2140/60* (2018.01); *G05B 2219/2614* (2013.01)

(56) References Cited

U.S. PATENT DOCUMENTS

| | | | |
|---|---|---|---|
| 2010/0332044 A1* | 12/2010 | McLean | G06Q 10/06 700/291 |
| 2011/0029897 A1* | 2/2011 | Russell | G05B 15/02 715/757 |
| 2011/0276533 A1* | 11/2011 | Ludwig | G06Q 10/06 707/600 |
| 2012/0259469 A1* | 10/2012 | Ward | G05B 15/02 700/276 |
| 2013/0060391 A1* | 3/2013 | Deshpande | G05D 23/1924 700/291 |
| 2013/0116842 A1 | 5/2013 | Saito et al. | |
| 2013/0179373 A1* | 7/2013 | Mutchnik | G06Q 30/0283 705/412 |
| 2013/0325377 A1* | 12/2013 | Drees | G06Q 10/06 702/61 |
| 2014/0249876 A1* | 9/2014 | Wu | G05B 15/02 705/7.12 |
| 2014/0365017 A1* | 12/2014 | Hanna | F24F 11/30 700/276 |
| 2015/0032264 A1* | 1/2015 | Emmons | F24F 11/0001 700/276 |
| 2015/0057810 A1* | 2/2015 | Smith | F24F 11/62 700/276 |
| 2015/0178865 A1* | 6/2015 | Anderson | G05B 17/02 705/7.25 |
| 2015/0325096 A1* | 11/2015 | Hatch | F24F 11/30 340/601 |
| 2016/0033947 A1* | 2/2016 | Sundar M | H04L 67/10 700/275 |

FOREIGN PATENT DOCUMENTS

| | | |
|---|---|---|
| JP | 2003-067514 A | 3/2003 |
| JP | 2004-326411 A | 11/2004 |
| JP | 2005-107797 A | 4/2005 |
| JP | 2010-108108 A | 5/2010 |
| JP | 2010-198502 A | 9/2010 |
| JP | 2013-102637 A | 5/2013 |

OTHER PUBLICATIONS

International Search Report issued in Application No. PCT/JP2015/004549 dated Nov. 10, 2015, with English translation.

* cited by examiner

AIR INFORMATION MANAGEMENT APPARATUS

RELATED APPLICATIONS

This application is the U.S. National Phase under 35 U.S.C. § 371 of International Application No. PCT/JP2015/004549, filed in Sep. 8, 2015, which in turn claims the benefit of Japanese Application No. 2014-190887, Sep. 19, 2014, the disclosures of which are incorporated by reference herein.

TECHNICAL FIELD

The present invention relates to an air information management apparatus which manages air information.

BACKGROUND ART

There has been a system that collects weather information indicating the state of the atmosphere and provides the collected weather information. Examples of such a system include a system disclosed in. Patent Literature (PTL) 1. The system disclosed in PTL 1 processes weather information and provides the processed weather information to a user. Furthermore, the system disclosed in PTL 1 assists the creation of a driving index, the planning of arrangement of personnel, and the issuance of warning on the basis of the collected weather information.

CITATION LIST

Patent Literature

PTL 1: Japanese Unexamined Patent Application Publication No. 2003-067514

SUMMARY OF THE INVENTION

Technical Problem

Weather information obtained from a weather observation station, a weather satellite, or the like, however, indicates an air environment in a wide region. Thus, there are instances where knowledge of the air environment in a small spot included in one region cannot be gained by a resident of a different region. Specifically, a person wishing to purchase a piece of real estate may fail to gain knowledge of the air environment in the piece of real estate.

For example, even within the same region, the outside air temperature or the humidity; etc., is different at each spot depending on the geographical conditions thereof. In a housing complex, the outside air temperature or the humidity, etc., is different on each floor or at each dwelling unit. More specifically, a room on the third floor with lots of natural light and a room on the first floor with little natural light have different outside air temperatures.

Accordingly, the need for ventilation adjustment and temperature adjustment through an air conditioner in each dwelling unit is different. Use or nonuse of an air conditioner and a difference in the air conditioner use rate between dwelling units appear as a difference in electricity usage.

There are instances where a person wishing to purchase a dwelling unit in a housing complex cannot gain the sense of actual temperatures in each season, the electricity usage of an air conditioner, and the like until the person starts living in the dwelling unit after purchase. A person who purchased a dwelling unit may finally gain the sense of temperatures, the electricity usage, and so on after the person starts living in the dwelling unit. Therefore, a person who purchased a dwelling unit often feels differently than expected before the purchase, for example, with the impression that "it is so cold here".

In the case of not only a housing complex, but also an independent house as well, a person considering to move from a current living region to another region has difficulty in gaining knowledge of actual temperatures in another region., an electricity usage for living in another region, and so on. Therefore, a person who moved to another region often feels differently than expected, for example, with the impression that "the electricity usage in this region is so high", finally after the person started living in the region.

In light of the foregoing, an object of the present invention is to provide an air information management apparatus capable of displaying, on a display apparatus, information indicating an air environment in a target area.

Solution to Problem

In order to achieve the aforementioned object, an air information management apparatus according to an aspect of the present invention includes: an obtainer that obtains an air state of a target area from a sensor installed in either one of the target area and an area surrounding the target area; an information processor that derives, from a record of the air state statistical information on the air state measured for the target area during a predetermined period; and a display controller that causes a display apparatus to display, as information indicating an air environment in the target area, the statistical information derived by the information processor.

ADVANTAGEOUS EFFECT OF INVENTION

An air information management apparatus according to an aspect of the present invention is capable of displaying, on a display apparatus, information indicating an air environment in a target area.

DESCRIPTION OF EXEMPLARY EMBODIMENT

Hereinafter, an embodiment of the present invention will be described in detail with reference to the drawings. Note that each embodiment described below shows a general or specific example. The numerical values, shapes, materials, structural elements, the arrangement and connection of the structural elements, the order of processes etc. shown in the following embodiment are mere examples, and are not intended to limit the scope of the present invention. Furthermore, among the structural elements in the following embodiment, structural elements not recited in an independent claim indicating the broadest concept of the present invention are described as arbitrary structural elements.

There are instances where a state, a record, and an environment, etc., mean information on a state, information on a record, and information on an environment, etc., respectively, in the subsequent description.

Embodiment

The present embodiment describes a basic configuration of an air information management apparatus which manages air information and a specific example of the air information management apparatus. The air information herein is information on the air and is specifically information on an air state, an air state record, an air environment, and the like.

The air state is the state of air that changes over time and includes, for example, the temperature of air, the humidity of air, and the quality of air. The air state may also include an amount of light in the air and an amount of solar radiation. Furthermore, the air state may include the state of the atmosphere, that is, a meteorological condition. The meteorological condition include weather indicating a sky condition. The air state may correspond to one of these elements or may correspond to more than one of these elements.

The air state record is a record of the air state and includes, for example, a plurality of air states at a plurality of points in time as information.

The air environment is an atmospheric environment and is, for example, made up of the air state and. the like. Since the air environment and the air state have the same nature, there are instances where the air environment can be replaced by the air state as an expression; conversely, there are instances where the air state can be replaced by the air environment as an expression. The air environment may be expressed as information indicating the air state or may be expressed as statistical information on the air state. For example, the air environment may correspond to one element among the temperature, the humidity, the average temperature during a predetermined period, the average humidity during a predetermined period., and the like, or may correspond to more than one of these elements.

Figure 1:
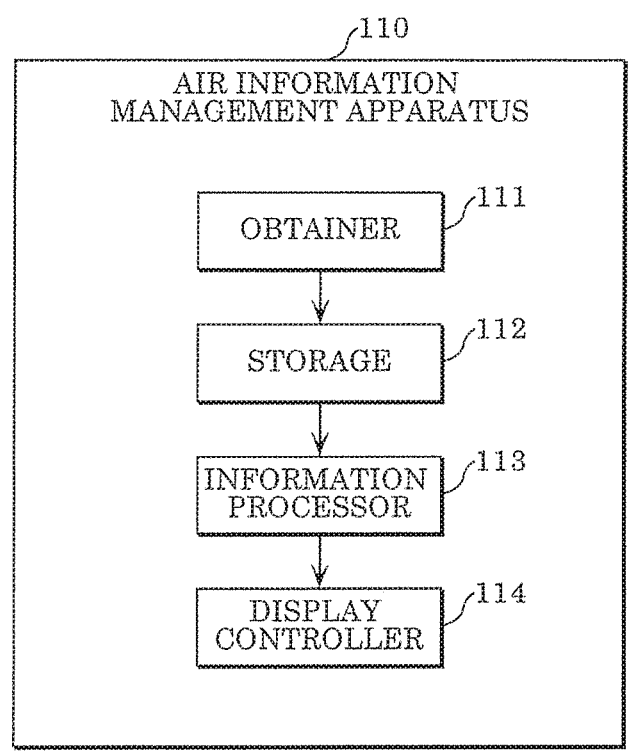
FIG. 1 is a block diagram illustrating a main configuration of an air information management apparatus according to an embodiment of the present invention.

FIG. 1 is a block diagram illustrating a main configuration of an air information management apparatus according to the present embodiment. Air information management apparatus 110 illustrated in FIG. 1 manages air information. Specifically, air information management apparatus 110 includes obtainer 111, storage 112, information processor 113, and display controller 114.

Obtainer 111 obtains an air state of a target area from a sensor installed in the target area or its surrounding area. For example, the target area is a parcel of land to be traded as a piece of real estate. The piece of real estate herein may be a piece of real estate for purchase or may be a piece of real estate for rent. The target area herein may be a land, may be a building, or may be a part of a building. More specifically, the target area is to be used for a purpose different from that for meteorological observation and may be a dwelling unit in a housing complex, may be an independent house, may be an industrial plant, may be a commercial facility or may be farmland.

The surrounding area around the target area corresponds to an area in a predetermined range from the target area and is, for example, within a range of no more than 100 m from the target area. The predetermined range may be relatively determined to be, for example, ten times the size of the target area. When the target area is a dwelling unit in a housing complex, for example, the sensor may be installed on a dwelling unit around the target area. The sensor may be installed on an independent house around the target area or may be installed in a park around the target area.

The air state record which is a record of the air state obtained by obtainer 111 is stored in storage 112. Information processor 113 derives, from the air state record stored in storage 112, statistical information on the air state measured for the target area during a predetermined period. The predetermined period may be one month, may be one year, or may be any other period of time.

Display controller 114 causes the display apparatus to display; as information indicating the air environment in the target area, the statistical information derived by information processor 113.

Thus, air information management apparatus 110 is capable of displaying, on the display apparatus, information indicating the air environment in the target area.

For example, the statistical information may include the total number of times a predetermined event related to the air state occurs in the target area during the predetermined period or may include the average value of air states measured for the target area during the predetermined period. With this, the air environment in the target area is appropriately presented. The predetermined event is, for example, a sultry night or an extremely hot day.

Furthermore, a plurality of recommendations for use of the target area may be stored in storage 112 in association with a plurality of air environments. Information processor 113 may then select, from among the plurality of recommendations stored in storage 112, a recommendation associated with the air environment indicated by the statistical information. Subsequently, display controller 114 may cause the display apparatus to display the recommendation selected by information processor 113. Thus, air information management apparatus 110 is capable of displaying an appropriate recommendation for the target area.

Each of the plurality of recommendations may include a building type recommended for use of the target area or may include a building floor plan recommended for use of the target area, for example. With this, air information management apparatus 110 is capable of presenting a plan for new construction or renovation.

Furthermore, a plurality of price parameters for determining a property price for the target area, for example, may be stored in storage 112 in association with the plurality of air environments. The property price may be a purchase price for a piece of real estate corresponding to the target area or may be a rental price for a piece of real estate corresponding to the target area. Information processor 113 may determine the property price using a price parameter associated with the air environment indicated by the statistical information from among the plurality of price parameters stored in storage 112.

Subsequently, display controller 114 may cause the display apparatus to display the property price determined by information processor 113. Thus, air information management apparatus 110 is capable of presenting an appropriate property price.

Furthermore, the target area may be a dwelling unit in a housing complex, and. the sensor may be installed in a dwelling unit on the same floor of the housing complex as the target area, for example. With this, the statistical information on the air state obtained from the sensor installed in the dwelling unit on the same floor as the target area is presented as information indicating the air environment in the target area. The air environment in the target area and the air environment in the dwelling unit on the same floor as the target area are expected to be similar to each other. Thus, air information management apparatus 110 is capable of presenting appropriate information as the information indicating the air environment in the target area.

The target area may be each of a plurality of dwelling units in a housing complex, for example. Obtainer 111 may then obtain the air state of each dwelling unit. And the air state record of each dwelling unit may be stored in storage 112. Subsequently, information processor 113 may derive statistical information of each dwelling unit. Thereafter, display controller 114 may cause the display apparatus to display the statistical information as the information indicating the air environment in each dwelling unit. Thus, air information management apparatus 110 is capable of presenting the air environment in each dwelling unit in a housing complex.

Furthermore, obtainer 111 may obtain the electricity usage for the target area or its surrounding area, for example. And an electricity usage record. which is a record of the electricity usage obtained by obtainer 111 may be stored into storage 112. Subsequently, information processor 113 may derive, from the electricity usage record stored into storage 112, an electricity usage related to the air state measured for the target area during the predetermined period. Thereafter, display controller 114 may cause the display apparatus to display the electricity usage derived by information processor 113.

Thus, air information management apparatus 110 is capable of presenting an expected electricity usage that depends on the air state of the target area.

Furthermore, obtainer 111 may obtain the air state from each of the sensors installed in the target area or its surrounding area, for example. Subsequently, information processor 113 may derive the statistical information for each of the target area and its surrounding area or may collectively derive the statistical information for the target area and its surrounding area.

The target area is not required to be a parcel of land to be immediately traded. as a piece of real estate and may be a parcel of land to be traded as a piece of real estate after a predetermined condition such as a resident's move-out is met. Display controller 114 may cause display apparatus 310 to display the statistical information and the information on the piece of real estate together so that the statistical information is displayed on display apparatus 310 as information indicating the air environment in the piece of real estate. The information on the piece of real estate may be identification information for identifying the piece of real estate such as the address of the piece of real estate, may be a price for the piece of real estate, or may be the floor plan of the piece of real estate.

A more specific example of air information management apparatus 110 illustrated in FIG. 1 will be described below with reference to FIG. 2 to FIG. 10.

Figure 2:
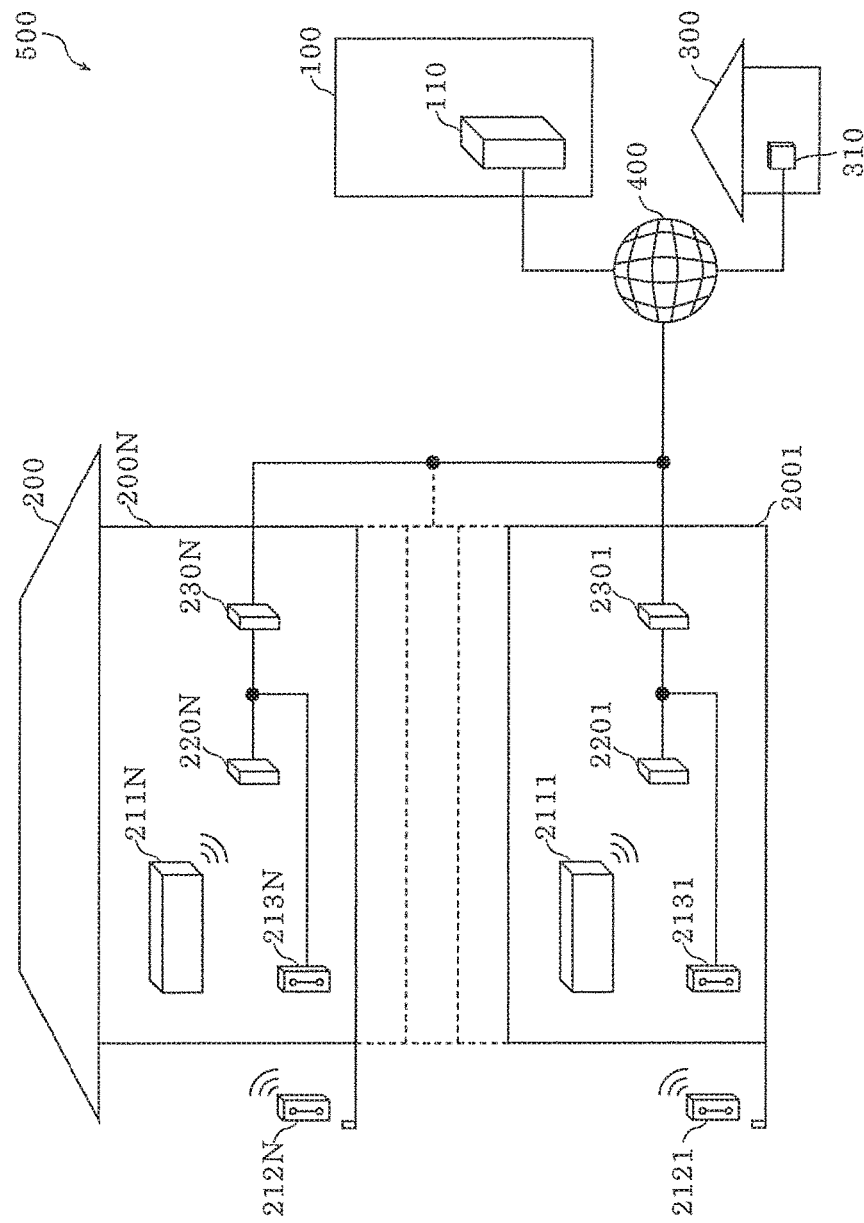
FIG. 2 schematically illustrates a use environment in which an air information management system according to an embodiment of the present invention is used.

FIG. 2 schematically illustrates a use environment in which an air information management system including air information management apparatus 110 illustrated in FIG. 1 is used. Air information management system 500 illustrated in FIG. 2 includes home appliances 2111 and 211N, energy management apparatuses 2201 and 220N, gateway apparatuses 2301 and 230N, air information management apparatus 110, and the like. Air information management system 500 may further include outdoor sensors 2121 and 212N and indoor sensors 2131 and 213N or may further include display apparatus 310.

Home appliances 2111 and 211N, outdoor sensors 2121 and 212N, indoor sensors 2131 and 213N, energy management apparatuses 2201 and 220N, and gateway apparatuses 2301 and 230N are installed on housing complex 200.

Specifically, home appliance 2111, outdoor sensor 2121, indoor sensor 2131, energy management apparatus 2201, and gateway apparatus 2301 are installed on dwelling unit 2001 on the first floor of housing complex 200. In the example in FIG. 2, indoor sensor 2131, energy management apparatus 2201, and gateway apparatus 2301 are connected to each other via communication cables and can communicate with each other. Home appliance 2111, outdoor sensor 2121, and energy management apparatus 2201 can communicate with each other via wireless communication.

Likewise, home appliance 211N, outdoor sensor 212N, indoor sensor 213N, energy management apparatus 220N, and gateway apparatus 230N are installed on dwelling unit 200N on the N-th floor of housing complex 200. In the example in FIG. 2, indoor sensor 213N, energy management apparatus 220N, and gateway apparatus 230N are connected to each other via communication cables and, can communicate with each other. Home appliance 211N, outdoor sensor 212N, and energy management apparatus 220N can communicate with each other via wireless communication.

Although omitted in FIG. 2, elements similar to those in dwelling unit 2001 or dwelling unit 200N are installed on a dwelling unit on each floor of housing complex 200.

Gateway apparatuses 2301 and 230N in housing complex 200, air information management apparatus 110 in firm 100, and display apparatus 310 in house 300 are connected to each other via communication network 400.

Each of home appliances 2111 and 211N includes a sensor that measures the air state and is, for example, an air conditioner. Home appliances 2111 and 211N may each measure its own electricity usage.

Outdoor sensors 2121 and 212N each measure the air state and are installed outside dwelling units 2001 and 200N. Each of outdoor sensors 2121 and 212N measures, in particular, the outside air temperature, the outdoor humidity, the outdoor air quality, or the like. Outdoor sensors 2121 and 212N may measure the electricity usages of dwelling units 2001 and 200N.

Indoor sensors 2131 and 213N each measure the air state and are installed inside dwelling units 2001 and 200N. Each of indoor sensors 2131 and 213N measures, in particular, the room temperature, the indoor humidity, the indoor air quality, or the like. Indoor sensors 2131 and 213N may measure the electricity usages of dwelling units 2001 and 200N.

Energy management apparatuses 2201 and 220N manage electric energy that is used by home appliances 2111 and 211N in dwelling units 2001 and 200N. For example, each of energy management apparatuses 2201 and 220N is also called a smart energy gateway (SEG) and is a controller for a home energy management system (HEMS).

Specifically, energy management apparatuses 2201 and 220N collect the electricity usages of home appliances 2111 and 211N, etc., in dwelling units 2001 and 200N. Furthermore, energy management apparatuses 2201 and 220N limit the electricity usages of home appliances 2111 and 211N, etc. Moreover, energy management apparatuses 2201 and 220N may measure the air state.

Gateway apparatuses 2301 and 230N are also each called a home gateway and are used to connect networks in dwelling units 2001 and 200N and external communication network 400. For example, energy management apparatuses 2201 and 220N, etc., connect to communication network 400 via. gateway apparatuses 2301 and 230N. Furthermore, gateway apparatuses 2301 and 230N may each measure the air state or may measure the electricity usages of dwelling units 2001 and 200N.

Communication network 400 is a network for communication and is, for example, the Internet. Communication network 400 may be another public line or may be a dedicated line. Communication network 400 may be a wired network or may be a wireless network.

Air information management apparatus 110 is a server apparatus that manages the air information. Specifically, air information management apparatus 110 obtains the air states from dwelling units 2001, 200N, etc., and stores the air states into storage 112 therein. Furthermore, air information management apparatus 110 derives statistical information on the air states and outputs the statistical information.

Display apparatus 310 displays information and is, for example, a personal computer with a screen. Display apparatus 310 may be a television apparatus capable of communication, may be a mobile phone, or may be a smartphone.

Figure 3:
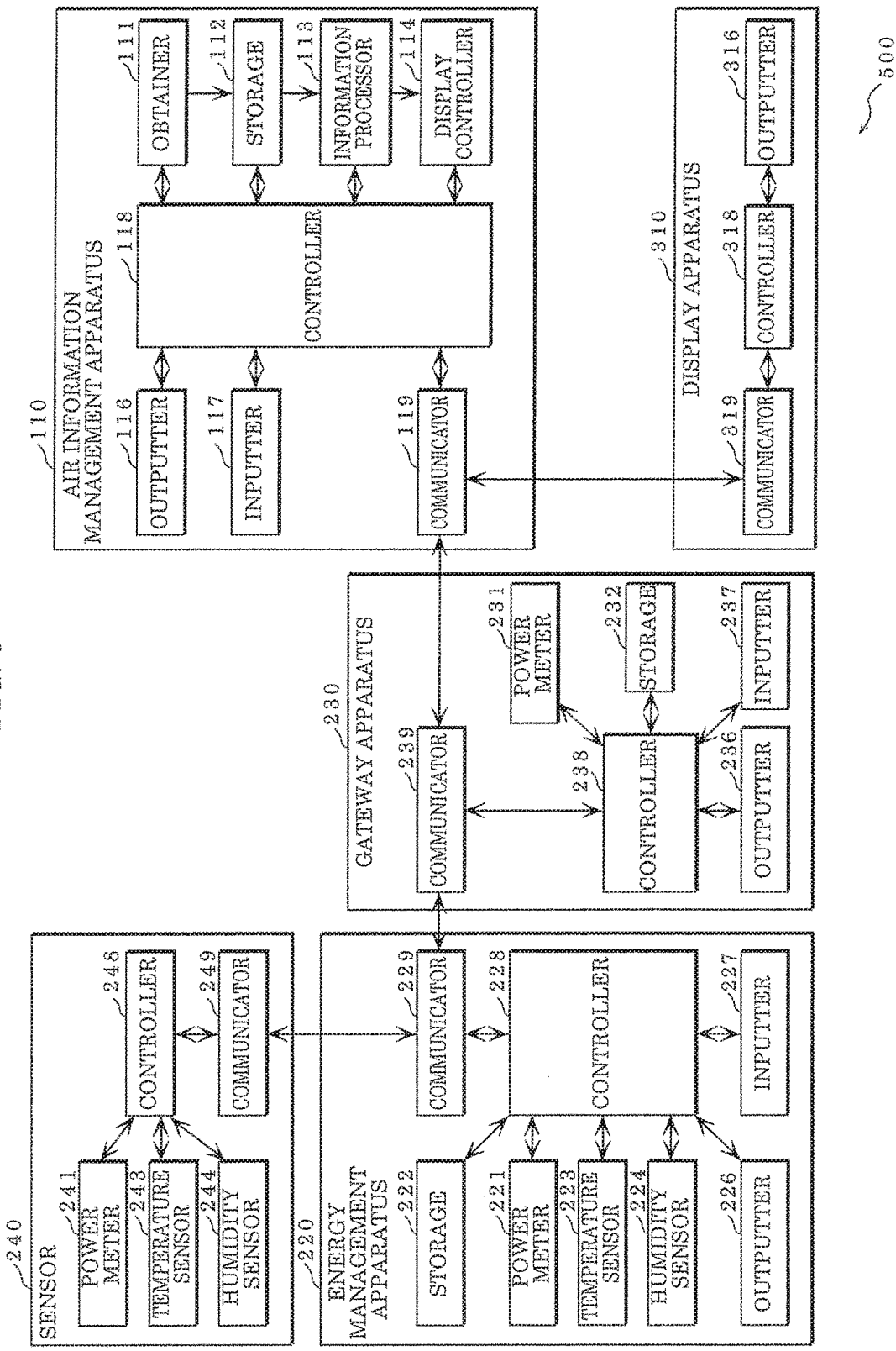
FIG. 3 is a block diagram illustrating a configuration of an air information management system according to an embodiment of the present invention.

FIG. 3 is a block diagram illustrating the configuration of air information management system 500 illustrated in FIG. 2. Specifically, FIG. 3 illustrates sensor 240, energy management apparatus 220, gateway apparatus 230, air information management apparatus 110, and display apparatus 310 as structural elements of air information management system 500. For example, sensor 240, energy management apparatus 220, and gateway apparatus 230 are installed on each dwelling unit in housing complex 200.

Sensor 240 measures the air state of a dwelling unit on which sensor 240 is installed. The air state is the temperature of air, the humidity of air, the quality of air, or the like. The quality of air may include a PM2. 5 concentration or may include a dispersed-pollen count, for example. For example, sensor 240 is included in each of home appliances 2111 and 211N, outdoor sensors 2121 and 212N, indoor sensors 2131 and 213N, etc., illustrated in FIG. 2.

Sensor 240 includes power meter 241, temperature sensor 243, humidity sensor 244, controller 248, and communicator 249. Sensor 240 may include only a part of these structural elements. Furthermore, sensor 240 may include an air quality sensor that measure the quality of air or a meteorological sensor that measures meteorological data, for example.

Power meter 241 measures the electricity usage of the dwelling unit on which sensor 240 is installed. For example, power meter 241 measures the electricity usage of home appliance 2111 in dwelling unit 2001 or the electricity usage of home appliance 211N in dwelling unit 200N. Power meter 241 may measure the electricity usage via a smart meter on the dwelling unit on which sensor 240 is installed. Power meter 241 may measure the electricity usage of each of a plurality of home appliances in the dwelling unit on which sensor 240 is installed.

When sensor 240 including power meter 241 is included in each of the plurality of home appliances in the dwelling unit, power meter 241 included in each of the plurality of home appliances may measure only the electricity usage of the home appliance including power meter 241 among the plurality of home appliances. Thus, each of the plurality of home appliances in the dwelling unit measures the electricity usage thereof. Energy management apparatus 220 can collect the electricity usages measured by the plurality of home appliances in the dwelling unit, to measure the entire electricity usage of the plurality of home appliances in the dwelling unit.

Temperature sensor 243 measures the temperature. Specifically, temperature sensor 243 measures the temperature of air in the dwelling unit on which sensor 240 is installed. When sensor 240 is installed outside the dwelling unit, temperature sensor 243 measures the outside air temperature; when sensor 240 is installed inside the dwelling unit, temperature sensor 243 measures the room temperature.

Humidity sensor 244 measures the humidity. Specifically, humidity sensor 244 measures the humidity of air in the dwelling unit on which sensor 240 is installed. When sensor 240 is installed outside the dwelling unit, humidity sensor 244 measures the outdoor humidity; when sensor 240 is installed inside the dwelling unit, humidity sensor 244 measures the room humidity.

Controller 248 controls the operation of sensor 240. For example, controller 248 obtains information on the measurements performed by power meter 241, temperature sensor 243, and humidity sensor 244. Furthermore, controller 248 transmits the information to energy management apparatus 220 via communicator 249.

Communicator 249 communicates with energy management apparatus 220 over wired or wireless communication. Specifically, under the control of controller 248, communicator 249 transmits, to energy management apparatus 220, information on the measurements performed by power meter 241, temperature sensor 243, and humidity sensor 244. Communicator 249 may be able to communicate with gateway apparatus 230.

Energy management apparatus 220 manages electric energy that is used by a home appliance in the dwelling unit on which energy management apparatus 220 is installed. For example, energy management apparatus 220 corresponds to each of energy management apparatuses 2201 and 220N illustrated in FIG. 2.

Energy management apparatus 220 includes power meter 221, storage 222, temperature sensor 223, humidity sensor 224, outputter 226, inputter 227, controller 228, and communicator 229. In particular, temperature sensor 223 and humidity sensor 224 are arbitrary structural elements; energy management apparatus 220 need not include temperature sensor 223 or humidity sensor 224.

Power meter 221 measures the electricity usage of the dwelling unit on which energy management apparatus 220 is installed. Specifically, power meter 221 measures the electricity usage of home appliance 2111 in dwelling unit 2001 or the electricity usage of home appliance 211N in dwelling unit 200N. Power meter 221 may measure the electricity usage via a smart meter on the dwelling unit on which energy management apparatus 220 is installed.

Power meter 221 may measure the electricity usage of each of a plurality of home appliances in the dwelling unit on which energy management apparatus 220 is installed. Furthermore, power meter 221 may measure the electricity usage of the dwelling unit in cooperation with power meter 241 of sensor 240 or may measure the electricity usage of the dwelling unit instead of power meter 241 of sensor 240.

For example, power meter 221 may measure the electricity usage of the dwelling unit by collecting electricity usages from sensor 240 and gateway apparatus 230 via communicator 229 and measuring the electricity usage of energy management apparatus 220. In other words, sensor 240, gateway apparatus 230, and energy management apparatus 220 may measure their own electricity usages, and power meter 221 of energy management apparatus 220 may measure the electricity usage of the dwelling unit by collecting the measured electricity usages.

The temperatures, humidity, and electricity usages, etc., measured by sensor 240 or energy management apparatus 220 are stored in storage 222 as a record. In other words, a temperature record, a humidity record, and an electricity usage record, etc., are stored in storage 222.

Temperature sensor 223 measures the temperature. Specifically, temperature sensor 223 measures the temperature of air in the dwelling unit on which energy management apparatus 220 is installed. Since energy management apparatus 220 is installed inside the dwelling unit, temperature sensor 223 measures the room temperature.

Humidity sensor 224 measures the humidity. Specifically humidity sensor 224 measures the humidity of air in the dwelling unit on which energy management apparatus 220 is installed. Since energy management apparatus 220 is installed inside the dwelling unit, humidity sensor 224 measures the room humidity.

Outputter 226 outputs information. For example, under the control of controller 228, outputter 226 outputs the temperature, humidity; and electricity usage, etc., measured by sensor 240 or energy management apparatus 220. Furthermore, under the control of controller 228, outputter 226 outputs the record information stored in storage 222. Specifically outputter 226 may include a screen and output the information to the screen. Furthermore, outputter 226 may include, for example, a monitor lamp for outputting information on the operation of energy management apparatus 220.

Information is entered into inputter 227. For example, inputter 227 includes a button, and when the button is pressed do n, information is entered into inputter 227. Outputter 226 and inputter 227 may be included in a single touch panel. More specifically, a time interval for energy management apparatus 220 to collect information from sensor 240 etc., may be entered into inputter 227. And outputter 226 may output, to the screen, information for inputting the time interval.

Controller 228 controls the operation of energy management apparatus 220. For example, controller 228 obtains information on the measurements performed by power meter 221, temperature sensor 223, and humidity sensor 224. Furthermore, controller 228 obtains, via communicator 229, information on the measurement performed by sensor 240. In addition, controller 228 stores the information into storage 222 and refers to the information stored in storage 222 when necessary. Furthermore, controller 228 transmits the information to gateway apparatus 230 via communicator 229.

Communicator 229 communicates with each of sensor 240 and gateway apparatus 230 over wired or wireless communication. Specifically, under the control of controller 228, communicator 229 receives, from sensor 240, the information on the measurement performed by sensor 240. Furthermore, under the control of controller 228, communicator 229 transmits, to gateway apparatus 230, the information on the measurement performed by sensor 240 or energy management apparatus 220.

Gateway apparatus 230 is used to connect communication network 400 and a network for the dwelling unit on which gateway apparatus 230 is installed. For example, gateway apparatus 230 corresponds to each of gateway apparatuses 2301 and 230N illustrated in FIG. 2. Gateway apparatus 230 includes power meter 231, storage 232, outputter 236, inputter 237, controller 238, and communicator 239.

Power meter 231 measures the electricity usage of the dwelling unit on which gateway apparatus 230 is installed. Specifically, power meter 231 measures the electricity usage of home appliance 2111 in dwelling unit 2001 or the electricity usage of home appliance 211N in dwelling unit 200N. Power meter 231 may measure the electricity usage via a smart meter on the dwelling unit on which gateway apparatus 230 is installed. Power meter 231 may measure the electricity usage of each of a plurality of home appliances in the dwelling unit on which gateway apparatus 230 is installed.

Power meter 231 may measure only the electricity usage of gateway apparatus 230. Energy management apparatus 220 may collect the electricity usages from sensor 240 and gateway apparatus 230, etc., to measure the electricity usage of the dwelling unit.

The temperature, humidity, and electricity usage, etc., measured by any of sensor 240, energy management apparatus 220, and gateway apparatus 230 are stored in storage 232 as a record. In other words, a temperature record, a humidity record, and an electricity usage record, etc., are stored in storage 232.

Outputter 236 outputs information. For example, under the control of controller 238, outputter 236 outputs the information stored in storage 232. Specifically, outputter 236 includes a screen and outputs the information to the screen. Furthermore, outputter 236 may include, for example, a monitor lamp for outputting information on the operation of gateway apparatus 230.

Information is entered into inputter 237. For example, inputter 237 includes a button, and when the button is pressed down, information is entered into inputter 237. Outputter 236 and inputter 237 may be included in a single touch panel.

Controller 238 controls the operation of gateway apparatus 230. For example, controller 238 obtains information on the measurement performed by power meter 231. Furthermore, controller 238 obtains, via communicator 239, information on the measurement performed by sensor 240 or energy management apparatus 220. In addition, controller 238 stores the information into storage 232 and refers to the information stored in storage 232 when necessary. Furthermore, controller 238 transmits the information to air information management apparatus 110 via communicator 239.

Communicator 239 communicates with each of energy management apparatus 220 and air information management apparatus 110. Specifically, under the control of controller 238, communicator 239 receives, from energy management apparatus 220, the information on the measurement performed by sensor 240 or energy management apparatus 220. Under the control of controller 238, communicator 239 transmits, to air information management apparatus 110, the information on the measurement performed by sensor 240, energy management apparatus 220, or gateway apparatus 230. Communicator 239 may be able to communicate with sensor 240.

Air information management apparatus 110 manages the air information. Specifically, air information management apparatus 110 includes obtainer 111, storage 112, information processor 113, display controller 114, outputter 116, inputter 117, controller 118, and communicator 119.

Obtainer 111 obtains the information from sensor 240, energy management apparatus 220, and gateway apparatus 230 via communicator 119 and. controller 118. Specifically, obtainer 111 obtains the temperature, humidity, and electricity usage, etc., measured by sensor 240, energy management apparatus 220, or gateway apparatus 230. And obtainer 111 stores the obtained information, specifically, temperature, humidity, and electricity usage, etc., into storage 112.

The information obtained by obtainer 111 is stored in storage 112 as a record for each dwelling unit. In other words, a temperature record, a humidity record, and an electricity usage record, etc., of each dwelling unit are stored in storage 112.

Information processor 113 derives statistical information of each dwelling unit from the record stored in storage 112. Information processor 113 may derive daily statistical information of each dwelling unit, may derive monthly statistical information of each dwelling unit, or may derive annual statistical information of each dwelling unit. The statistical information is, for example, the average, mode, maximum, or minimum, etc., of values of each of the temperature, the humidity, and the electricity usage. The statistical information may be the total number of times of a predetermined event such as the number of sultry nights.

Display controller 114 causes display apparatus 310 to display, as information indicating the air environment in the dwelling unit, the statistical information derived by information processor 113. Specifically, display controller 114 transmits the statistical information derived by information processor 113 to display apparatus 310 via controller 118 and communicator 119 to cause display apparatus 310 to display the statistical information as the information indicating the air environment in the dwelling unit.

Outputter 116 outputs information. For example, outputter 116 outputs the temperature, the humidity, the electricity usage, the record information, the statistical information, a combination thereof, or the like under the control of controller 118. Specifically, outputter 116 includes a screen and outputs the information to the screen. Furthermore, outputter 116 may include, for example, a printer and output the information to a sheet of paper through the printer. Moreover, outputter 116 may include, for example, a monitor lamp for outputting information on the operation of air information management apparatus 110.

Information is entered into inputter 117. For example, inputter 117 includes a button, and when the button is pressed down, information is entered into inputter 117. Inputter 117 may include a keyboard for entering information. Outputter 116 and inputter 117 may be included in a single touch panel.

Controller 118 controls the operation of air information management apparatus 110. For example, controller 118 obtains the information from gateway apparatus 230 via communicator 119. Furthermore, controller 118 transmits the information to display apparatus 310 via communicator 119. Moreover, controller 118 controls the transfer of information between the structural elements of air information management apparatus 110 and the operation of each of the structural elements.

Communicator 119 communicates with each of gateway apparatus 230 and display apparatus 310. Specifically, under the control of controller 118, communicator 119 receives, from gateway apparatus 230, the information on the measurement performed by sensor 240, energy management apparatus 220, or gateway apparatus 230. Furthermore, under the control of controller 118 and display controller 114, communicator 119 transmits, to display apparatus 310, the statistical information derived by information processor 113.

Display apparatus 310 displays the information. Specifically, display apparatus 310 includes outputter 316, controller 318, and communicator 319.

Outputter 316 outputs information. For example, outputter 316 outputs the information under the control of controller 318. Specifically, outputter 316 includes a screen and outputs the information to the screen. Furthermore, outputter 316 may, for example, include a monitor lamp for outputting information on the operation of display apparatus 310.

Controller 318 controls the operation of display apparatus 310. For example, controller 318 obtains the information from air information management apparatus 110 via communicator 319. Furthermore, controller 318 outputs the information via outputter 316.

Communicator 319 communicates with air information management apparatus 110. Specifically, communicator 319 receives the information from air information management apparatus 110.

On the basis of the configuration described above, air information management system 500 and air information management apparatus 110 cause display apparatus 310 to display the information indicating the air environment in the dwelling unit. Note that structural elements that perform the same or similar operations in the configuration described above may be gathered as a single structural element or may perform a single operation in cooperation. Furthermore, a supplementary structural element in the configuration described above may be omitted according to need. Next, the information (data) stored in air information management system 500 will be described.

Figure 4:
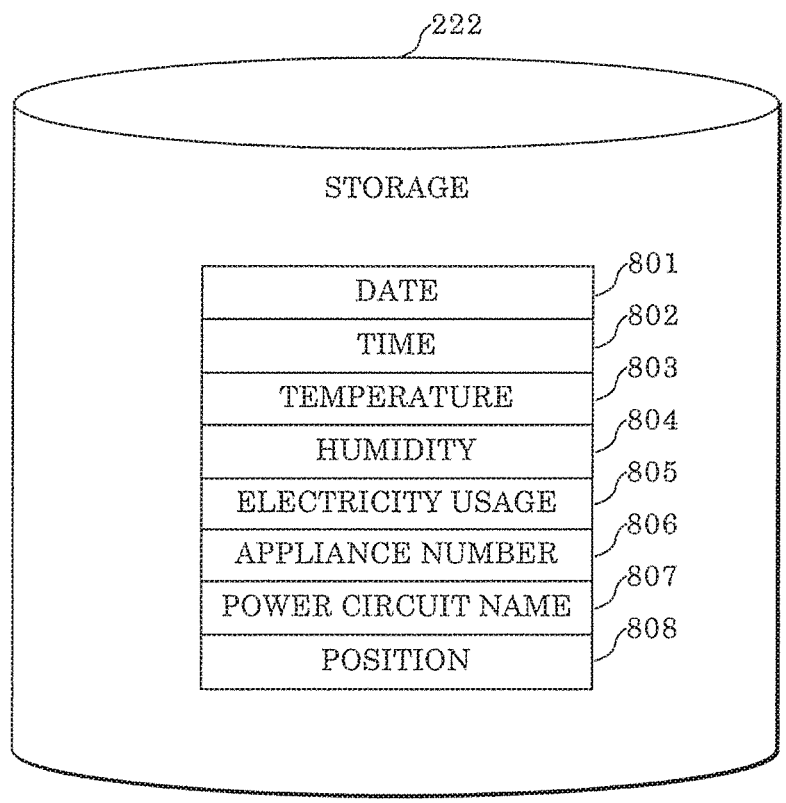
FIG. 4 is a data table indicating data in storage of an energy management apparatus according to an embodiment of the present invention.

FIG. 4 is a data table indicating data in storage 222 of energy management apparatus 220 illustrated in FIG. 3. For example, date 801, time 802, temperature 803, humidity 804, electricity usage 805, appliance number 806, power circuit name 807, position 808, and the like are stored in storage 222. Energy management apparatus 220 obtains such information from sensor 240, etc., and stores the information into storage 222.

Note that such information may be stored in storage 232 of gateway apparatus 230 or such information may be stored in both storage 222 of energy management apparatus 220 and storage 232 of gateway apparatus 230.

Date 801, time 802, temperature 803, humidity 804, electricity usage 805, appliance number 806, power circuit name 807, position 808, and the like illustrated in FIG. 4 indicate items to he stored into storage 222. Specifically, an information record including these items is stored in storage 222. In other words, a plurality of rows respectively including these items are stored. in storage 222.

Each of these items illustrated in FIG. 4 is an arbitrary item and is selectively stored when necessary. In other words, a part of these items need not be stored depending on the situation.

Date 801 is the date on which the temperature, the humidity, or the electricity usage is measured by sensor 240 or the like. For example, date 801 is represented by year, month, and date. Time 802 is the time at which the temperature, the humidity, or the electricity usage is measured by sensor 240 or the like. For example, time 802 is represented by hour, minute, and second.

Temperature 803 is the temperature measured by sensor 240 or the like. Humidity 804 is the humidity measured by sensor 240 or the like. Electricity usage 805 is the electricity usage measured by sensor 240 or the like.

Appliance number 806 is an identification number indicating an appliance, the electricity usage of which has been measured. When an appliance, the electricity usage of which has been measured, is identifiable, appliance number 806 is stored. For example, when each of home appliances 2111, 211N, etc., has measured an electricity usage thereof, the appliance, the electricity usage of which has been measured, is identifiable. In this case, appliance number 806 is stored into storage 222.

Power circuit name 807 indicates a power circuit, the electricity usage of which has been measured. Power circuit name 807 indicates, for example, an air conditioner power circuit, a refrigerator power circuit, a living room power circuit, a kitchen power circuit, or the like. Specifically power circuits are classified for each branch of a distribution board.

When a power circuit, the electricity usage of which has been measured, is identifiable, power circuit name 807 is stored. For example, when energy management apparatus 220 measures the electricity usage of each power circuit in the dwelling unit, energy management apparatus 220 can identify the power circuit, the electricity usage of which has been measured. In this case, power circuit name 807 is stored in storage 222.

Position 808 is the position in which the temperature, the humidity, or the electricity usage is measured by sensor 240 or the like. For example, position 808 may he the address of the dwelling unit on which sensor 240, etc., is installed. Position 808 may indicate the inside or outside of the dwelling unit.

Furthermore, a lot of information may be stored in storage 222 of energy management apparatus 220. For example, information on the quality of air or the meteorological condition measured by sensor 240 or the like may be stored.

Figure 5:
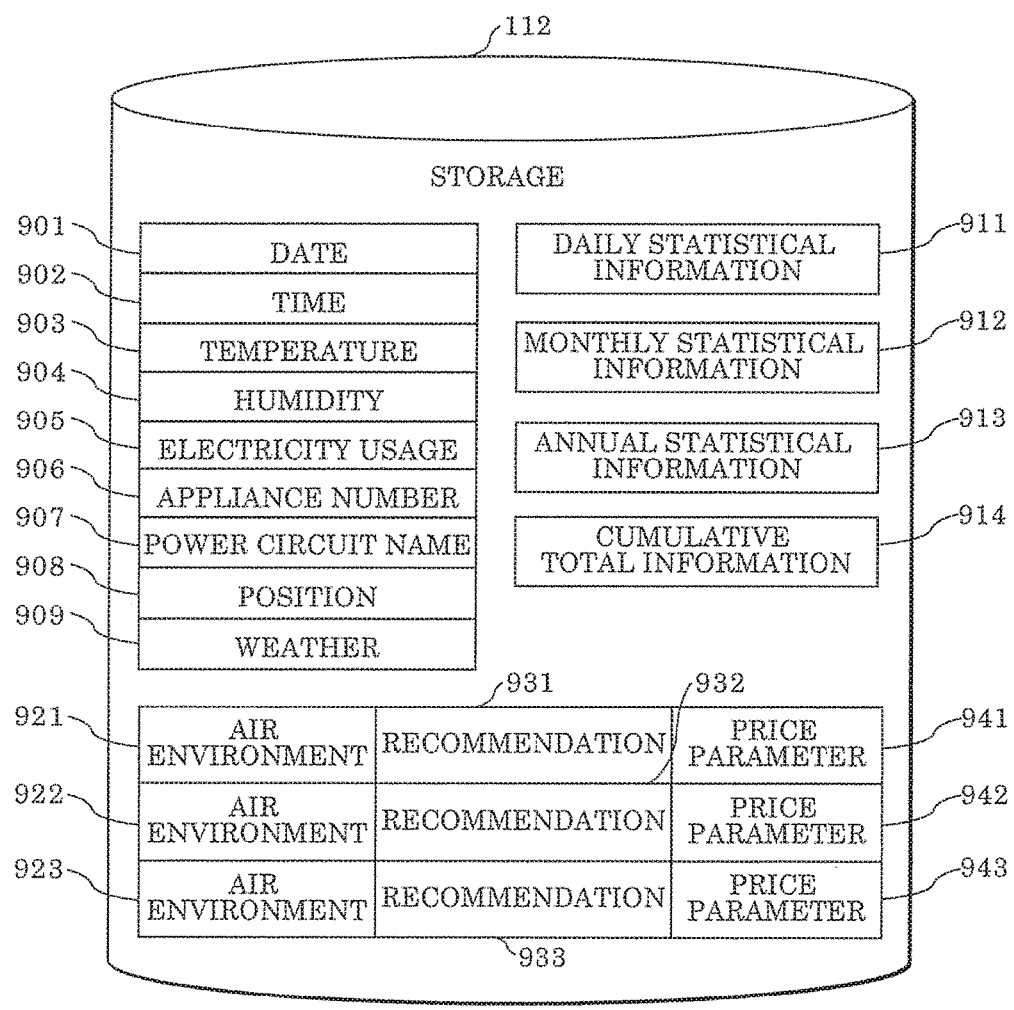
FIG. 5 is a data table indicating data in storage of an air information management apparatus according to an embodiment of the present invention.

FIG. 5 is a data table indicating data in storage 112 of air information management apparatus 110 illustrated in FIG. 3. For example, date 901, time 902, temperature 903, humidity 904, electricity usage 905, appliance number 906, power circuit name 907, position 908, weather 909, and the like are stored in storage 112. Obtainer 111 of air information management apparatus 110 obtains such information and stores the information into storage 112.

As in the example in FIG. 4, date 901, time 902, temperature 903, humidity 904, electricity usage 905, appliance number 906, power circuit name 907, position 908, weather 909, and the like illustrated in FIG. 5 indicate items to be stored into storage 112. Specifically, an information record including these items is stored in storage 112. In other words, a plurality of rows respectively including these items are stored in storage 112.

As in the example in FIG. 4, each of these items illustrated in FIG. 5 is an arbitrary item and is selectively stored when necessary. In other words, a part of these items need not be stored depending on the situation.

Date 901, time 902, temperature 903, humidity 904, electricity usage 905, appliance number 906, power circuit name 907, and. position 908 in storage 112 of air information management apparatus 110 are the same as or similar to the information in storage 222 of energy management apparatus 220. This information is transmitted from energy management apparatus 220 to air information management apparatus 110 via gateway apparatus 230 and stored into storage 112 of air information management apparatus 110. The information obtained from each of a plurality of dwelling units is stored into storage 112 of air information management apparatus 110.

Furthermore, as in storage 222 of energy management apparatus 220, a lot of information may be stored in storage 112 of air information management apparatus 110. For example, information on the quality of air or the meteorological condition measured by sensor 240 or the like may be stored. In the example in FIG. 5, weather 909 is stored in storage 112 of air information management apparatus 110.

Weather 909 is the weather in position 908 and indicates the sky condition in position 908. For example, weather 909 indicates sunny, rainy, cloudy, or the like condition. Information on weather 909 may be obtained from an observation device or the like instead of sensor 240.

Furthermore, daily statistical information 911, monthly statistical information 912, annual statistical information 913, and cumulative total information 914, etc., are stored in storage 112. Information processor 113 of air information management apparatus 110 derives daily statistical information 911, monthly statistical information 912, annual statistical information 913, and cumulative total information 914 from the records of temperature 903, humidity 904, and electricity usage 905, etc., and stores the derived information into storage 112.

Daily statistical information 911 is statistical information of temperature 903, humidity 904, electricity usage 905, appliance number 906, power circuit name 907, position 908, and weather 909, etc., which is based on day. Likewise, monthly statistical information 912 is statistical information based on a month, and annual statistical information 913 is statistical. information based on a year. Cumulative total information 914 is statistical information throughout the entire period.

Daily statistical information 911, monthly statistical information 912, annual statistical information 913, and cumulative total information 914 may include the statistical information of each dwelling unit or may include statistical information obtained in other statistical units.

Furthermore, the charge for electricity may be stored in storage 112. For example, the charge for electricity is derived by obtainer 111. or information processor 113 from electricity usage 905 and stored into storage 112 as a record of the charge for electricity for electricity usage 905. Information processor 113 may derive statistical information on the charge for electricity from the record of charges for electricity in the same manner as for electricity usage 905. The statistical information on the charge for electricity may be included in daily statistical information 911, monthly statistical information 912, annual statistical information 913, and cumulative total information 914.

Furthermore, air environments 921 to 923, recommendations 931 to 933, and price parameters 941 to 943 are stored in storage 112. Air environments 921 to 923, recommendations 931 to 933, and price parameters 941 to 943 may be stored into storage 112 in advance or may be stored into storage 112 on the basis of information entered into inputter 117.

Recommendation 931 and price parameter 941 are stored in storage 112 in association with air environment 921. Recommendation 932 and price parameter 942 are stored in storage 112 in association with air environment 922. Recommendation 933 and price parameter 943 are stored in storage 112 in association with air environment 923. Information processor 113 selects an appropriate recommendation from among recommendations 931, 932, and 933 and selects an appropriate price parameter from among price parameters 941, 942, and 943.

Specifically, information processor 113 derives the statistical information of the dwelling unit. When the derived statistical information indicates air environment 921 in storage 112, recommendation 931 associated with air environment 921 is selected as a recommendation for the dwelling unit. Furthermore, in this case, price parameter 941 associated with air environment 921 is selected as a price parameter for the dwelling unit.

Each of air environments 921 to 923 is a candidate air environment for the dwelling unit and is specifically stored in storage 112 in the same or similar format as the statistical information. For example, each of air environments 921 to 923 indicates the average, mode, maximum, or minimum, etc., of values of each of the temperature, the humidity, or the quality of air. Each of air environments 921 to 923 may indicate the total number of times of a predetermined event.

Each of recommendations 931 to 933 is a form recommended for use of the dwelling unit and indicates, for example, the number of persons who use the dwelling unit, the age group, the structure of family, the floor plan, or the like. Each of recommendations 931 to 933 may be a form recommended for use of an independent house, an industrial plant, a commercial facility, or a parcel of land. For example, each of recommendations 931 to 933 may indicate a building type or the like as a form recommended for use of a parcel of land.

More specifically, for example, among air environments 921 to 923 and recommendations 931 to 933, a recommendation indicating an elderly who spends a lot of time at home may be associated with an air environment offering a high level of comfort. Furthermore, for example, among air environments 921 to 923 and recommendations 931 to 933, a recommendation indicating the structure of family that does not include a child who is susceptible to heat stroke may be associated with a high-temperature air environment.

Furthermore, for example, among air environments 921 to 923 and recommendations 931 to 933, a recommendation, indicating a floor plan that provides high thermal insulation properties may be associated with a low-temperature air environment. Furthermore, for example, among air environments 921 to 923 and, recommendations 931 to 933, a recommendation indicating a floor plan that allows air to easily pass through may be associated with a high-humidity air environment.

Furthermore, for example, among air environments 921 to 923 and recommendations 931 to 933, a recommendation indicating a warehouse as the building type may be associated with a low-temperature, low-humidity air environment. Furthermore, for example, among air environments 921 to 923 and recommendations 931 to 933, a recommendation indicating a research institute as the building type may be associated with an air environment having little variation in temperature.

Information processor 113 selects, from among recommendations 931, 932, and 933, a recommendation associated with the air environment indicated by the derived statistical information. Display controller 114 causes display apparatus 310 to display the selected recommendation. With this, a person wishing to move into the dwelling unit can check adequacy, etc., of the person for the dwelling unit.

Each of price parameters 941 to 943 is for determining the property price for the dwelling unit. For example, among air environments 921 to 923 and price parameters 941 to 943, a price parameter for setting the property price high is associated with an air environment offering a high level of comfort. On the other hand, among air environments 921 to 923 and price parameters 941 to 943, a price parameter for setting the property price low is associated with an air environment offering a low level of comfort.

Information processor 113 determines the property price using, among price parameters 941 to 943, a price parameter associated with the air environment indicated by the statistical information on the air state. For example, each of price parameters 941 to 943 indicates an addition coefficient, a multiplication coefficient, or the like. The property price for the dwelling unit is determined by adding the addition coefficient to a standard price predetermined for the dwelling unit or multiplying the standard price by the multiplication coefficient.

Display controller 114 causes display apparatus 310 to display the determined property price. With this, a person wishing to move into the dwelling unit can check the value of the dwelling unit. Alternatively, a manager for the dwelling unit may determine the official property price for the dwelling unit on the basis of the property price displayed on display apparatus 310.

In this example, three recommendations 931 to 933 and three price parameters 941 to 943 are associated with three air environments 921 to 923. Thus, three combinations are illustrated. The number of combinations is not limited to three and may be two or less or may be four or more. The combination, of the air environments and the recommendations and the combination of the air environments and the price parameters may be handled separately.

Figure 6:
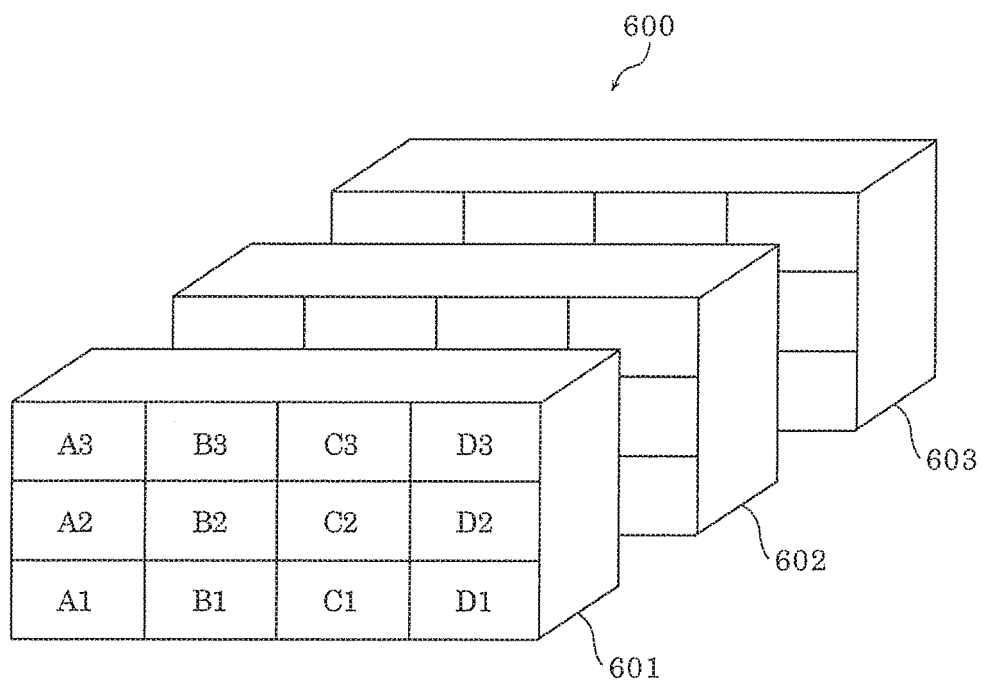
FIG. 6 schematically illustrates a first variation of a use environment in which an air information management system according to an embodiment of the present invention is used.

FIG. 6 schematically illustrates a first variation of the use environment illustrated in FIG. 2. Air information management system 500 illustrated in FIG. 3 may be used in housing complex group 600 illustrated in FIG. 6.

Specifically, sensor 240, energy management apparatus 220, and gateway apparatus 230 are installed on each of dwelling units A1, A2, A3, B1, B2, B3, C1, C2, C3, D1, D2, and D3 in housing complex 601. Likewise, sensor 240, energy management apparatus 220, and gateway apparatus 230 are installed on each of the dwelling units in housing complexes 602 and 603.

Obtainer 111 of air information management apparatus 110 obtains the temperature, the humidity; and the electricity usage, etc., from sensor 240 installed on each dwelling unit. The record of temperature, the record of humidity and the record of electricity usage, etc., of each dwelling unit are then stored into storage unit 112 of air information management apparatus 110. Information processor 113 of air information management apparatus 110 derives the statistical information of each dwelling unit. Display controller 114 of air information management apparatus 110 causes display apparatus 310 to display the derived statistical information of each dwelling unit.

Note that information, processor 113 of air information management apparatus 110 may derive the statistical information of each of housing complexes 601, 602, and 603. Display controller 114 of air information management apparatus 110 may then cause display apparatus 310 to display the statistical information of each of housing complexes 601, 602, and 603.

Furthermore, information processor 113 of air information management apparatus 110 may derive the statistical information of each floor of housing complex 601. Display controller 114 of air information management apparatus 110 may then cause display apparatus 310 to display the statistical information of each floor of housing complex 601.

Furthermore, for example, in housing complex 601, since dwelling unit B2 and dwelling unit C2 are on the same floor, the air environment in dwelling unit B2 and the air environment in dwelling unit C2 are expected to be similar to each other. The statistical information on the air state of dwelling unit B2 is expected to indicate not only the air environment in dwelling unit B2, but also the air environment in dwelling unit C2. Therefore, display controller 114 of air information management apparatus 110 may cause display apparatus 310 to display, as information indicating the air environment in dwelling unit C2, the derived statistical information of dwelling unit B2.

Figure 7:
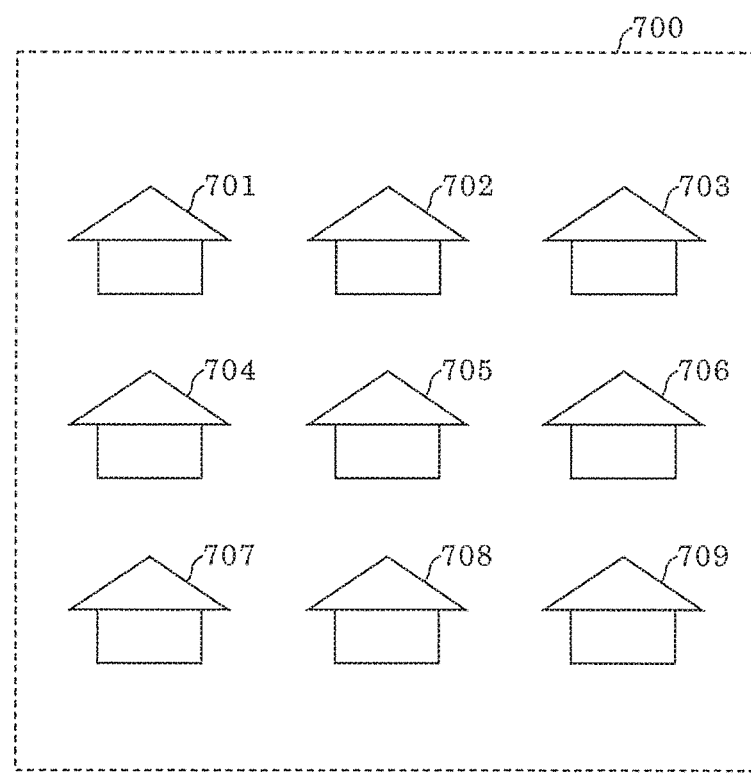
FIG. 7 schematically illustrates a second variation of an environment in which an air information management system according to an embodiment of the present invention is used.

FIG. 7 schematically illustrates a second. variation of the use environment illustrated in FIG. 2. Air information management system 500 illustrated in FIG, 3 may be used in housing group 700 illustrated in FIG. 7.

Specifically, sensor 240, energy management apparatus 220, and gateway apparatus 230 are installed on. each of houses 701 to 709 in housing group 700.

Obtainer 111 of air information management apparatus 110 obtains the temperature, the humidity, and the electricity usage, etc., from sensor 240 installed on each house. The record of temperature, the record of humidity; and the record of electricity usage, etc., of each house are then stored in storage unit 112 of air information management apparatus 110. Information processor 113 of air information management apparatus 110 derives the statistical information of each house. Display controller 114 of air information management apparatus 110 causes display apparatus 310 to display the derived statistical information of each house.

Information processor 113 of air information management apparatus 110 may derive statistical information of housing group 700 as statistical information of a collection of houses 701 to 709 in housing group 700. Display controller 114 of air information management apparatus 110 may then cause display apparatus 310 to display the statistical information of housing group 700.

Furthermore, for example, since the distance between house 705 and house 706 is short, the air environment in house 705 and the air environment in house 706 are expected to be similar to each other. Therefore, the statistical information on the air state of house 705 is expected to indicate not only the air environment in house 705, but also the air environment in house 706. Thus, display controller 114 of air information management apparatus 110 may cause display apparatus 310 to display, as information indicating the air environment in house 706, the derived statistical information of house 705.

Furthermore, for example, when house 707 is around a vacant lot, display controller 114 of air information management apparatus 110 may cause display apparatus 310 to display, as information indicating the air environment in the vacant lot, the statistical information on the air state in house 707.

Figure 8:
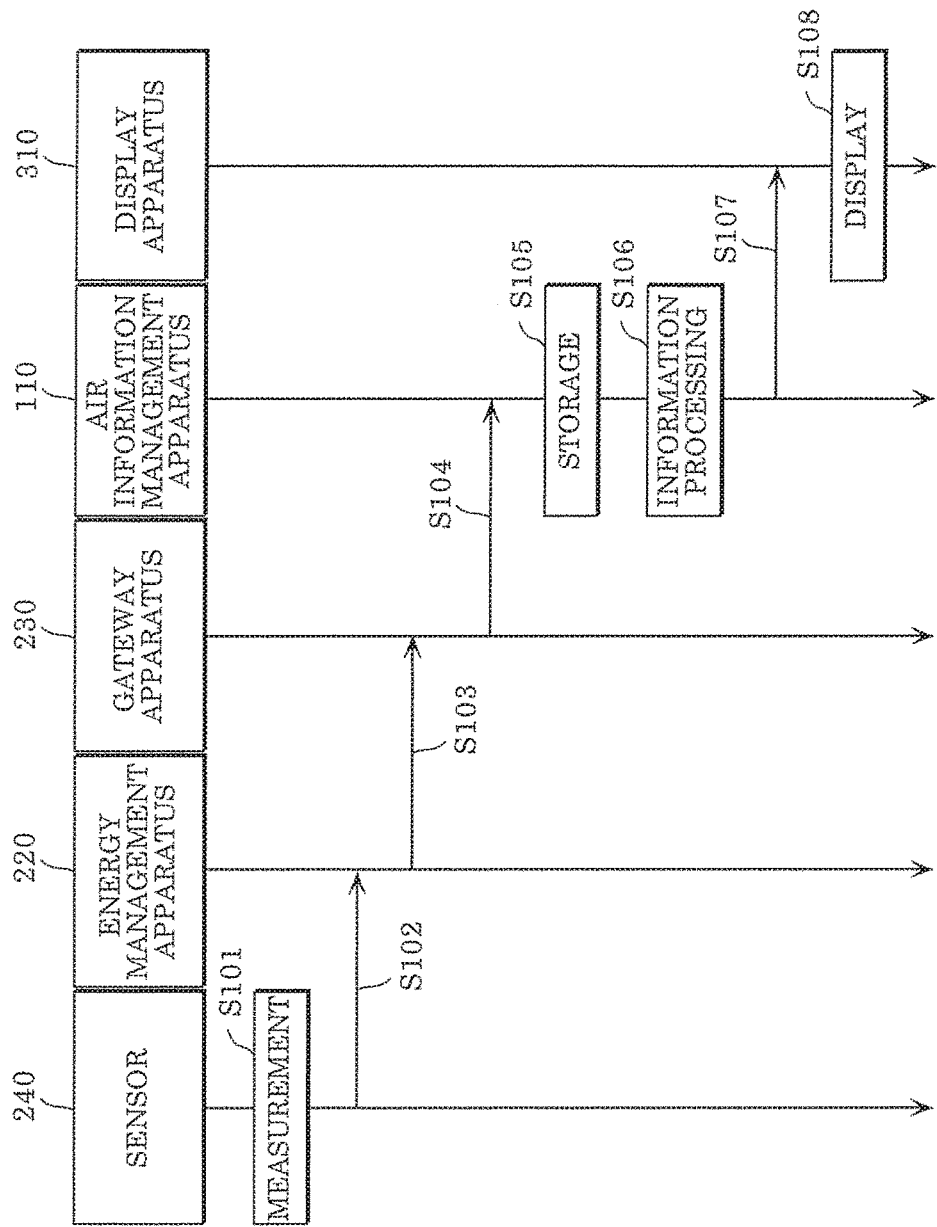
FIG. 8 is a sequence chart illustrating the operation of an air information management system according to an embodiment of the present invention.

FIG. 8 is a sequence chart illustrating the operation of air information management system 500 illustrated in FIG. 3. Each of the structural elements of air information management system 500 performs the operation illustrated in FIG. 8.

First, sensor 240 measures temperature, humidity, and electricity usage, etc. (S101). Information such as the temperature, humidity, and electricity usage, etc., measured by sensor 240 is transmitted from sensor 240 to energy management apparatus 220 (S102). At this time, energy management apparatus 220 may collect the information from sensor 240, or sensor 240 may autonomously transmit the information to energy management apparatus 220.

In the example in FIG. 2, energy management apparatus 2201 collects information such as the temperature, the humidity, and the electricity usage, etc., from home appliance 2111, outdoor sensor 2121, indoor sensor 2131, and the like. Likewise, energy management apparatus 220N collects information such as the temperature, the humidity, and the electricity usage, etc., from home appliance 211N, outdoor sensor 212N, indoor sensor 213N, and the like.

The information transmitted to energy management apparatus 220 is further transmitted to gateway apparatus 230 (S103). The information transmitted to gateway apparatus 230 is further transmitted to air information management apparatus 110 (S104). In other words, energy management apparatus 220 transmits the information to air information management apparatus 110 via gateway apparatus 230. Thus, the information such as the temperature, the humidity and the electricity usage, etc., from sensor 240 to air information management apparatus 110. Air information management apparatus 110 collects the information from a plurality of dwelling units.

In the example in FIG. 2, energy management apparatus 2201 transmits the information to air information management apparatus 110 via gateway apparatus 2301. Furthermore, energy management apparatus 220N transmits the information to air information management apparatus 110 via gateway apparatus 230N. Thus, the information such as the temperature, the humidity, and the electricity usage, etc., is transmitted from home appliances 2111 and 211N, outdoor sensors 2121 and 212N, indoor sensors 2131 and 213N, and the like to air information management apparatus 110.

Air information management apparatus 110 stores the information into storage 112 (S105). Specifically, obtainer 111 of air information management apparatus 110 obtains information such as the temperature, the humidity, and the electricity usage, etc., of each dwelling unit by obtaining the information transmitted from gateway apparatus 230. Obtainer 111 then stores the obtained information into storage 112 to store the records of temperature, humidity, and electricity usage, etc., of each dwelling unit.

Air information management apparatus 110 processes the information stored in storage 112 (S106). Specifically, information processor 113 of air information management apparatus 110 derives the statistical information of each dwelling unit from the information stored in storage 112. Information processor 113 may derive feature information of each dwelling unit such as the temperature, the humidity, and the electricity usage, etc., by analyzing the information stored in storage 112.

Air information management apparatus 110 transmits, to display apparatus 310, the information obtained through the information processing (S107). Specifically, display controller 114 of air information management apparatus 110 transmits the statistical information derived by information processor 113 to display apparatus 310 via communicator 119, etc., in order to cause display apparatus 310 to display the statistical information. Note that outputter 116 of air information management. apparatus 110 may output, onto a sheet of paper, the information obtained through information processing.

Display apparatus 310 displays the information transmitted from air information management; apparatus 110 (S108). In the example in FIG. 2, display apparatus 310 display, as information indicating the air environments in dwelling units 2001 and 200N, etc., the statistical information transmitted from air information management apparatus 110. With this, a person wishing to move into housing complex 200 can make an appropriate estimation of the air environments in dwelling units 2001 and 200N, etc., on the basis of the information displayed on display apparatus 310.

Figure 9:
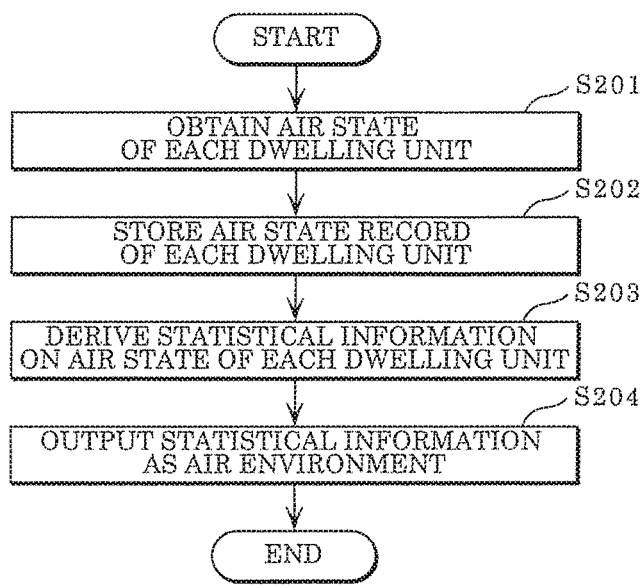
FIG. 9 is a flowchart illustrating the operation of an air information management apparatus according o an embodiment of the present invention.

FIG. 9 is a flowchart illustrating the operation of air information management apparatus 110 illustrated in FIG. 3. Air information management apparatus 110 illustrated in FIG. 3 performs the operation illustrated in FIG. 9.

First, obtainer 111 of air information management apparatus 110 obtains an air state of each dwelling unit from sensor 240 (S201). Next, obtainer 111 of air information management apparatus 110 stores, into storage 112, an air state record of each dwelling unit that is a record of the air state (S202). Next, information processor 113 of air information management apparatus 110 derives the statistical information of each dwelling unit on the air state from the air state record (S203). At the end, display controller 114 of air information management apparatus 110 outputs the statistical information as the air environment (S204).

Note that air information management apparatus 110 may collect an. electricity usage in addition to the air state. Specifically, obtainer 111 of air information management apparatus 110 obtains an electricity usage of each dwelling unit from sensor 240. Obtainer 111 of air information management apparatus 110 then stores, into storage 112, an electricity usage record of each dwelling unit that is a record of the electricity usage. Thereafter, information processor 113 of air information management apparatus 110 derives, from the electricity usage record stored in storage 112, an electricity usage related to the air state.

At this time, information processor 113 may derive an electricity usage of an air conditioner related to the air state. Alternatively, information processor 113 may derive electricity usage that changes with a change in temperature. Alternatively, information processor 113 may derive the electricity usage of a power circuit for the air conditioner. After the electricity usage is derived, display controller 114 of air information management apparatus HO causes display apparatus 310 to display the derived electricity usage. Thus, air information management apparatus 110 is capable of presenting the electricity usage related to the air state.

Furthermore, for example, the average temperature indicated by the statistical information may be dependent on the air conditioner, etc. Air information management apparatus 110 is capable of indicating the possibility that the average temperature may be dependent on the air conditioner, etc., by presenting the electricity usage via display apparatus 310. In addition, air information management apparatus 110 is capable of more appropriately indicating the possibility that the average temperature may be dependent on the air conditioner, etc., by presenting the electricity usage related to the air state.

Furthermore, information processor 113 may derive statistical information on the charge for electricity corresponding to the electricity usage, and display controller 114 may cause display apparatus 310 to display the statistical information on the charge for electricity. The electricity usage just mentioned may be the electricity usage related to the air state. In other words, the charge for electricity just mentioned may be the charge for electricity related to the air state. Specifically, the charge for electricity may be the charge for electricity consumed by the air conditioner.

Furthermore, the statistical information on the charge for electricity may be stored in storage 112 as described above. The statistical information on the charge for electricity may be a daily charge for electricity, may be a monthly charge for electricity, or may be an annual charge for electricity.

With this, a person wishing to move into the dwelling unit can estimate an approximate cost of the charge for electricity if the person lives there. Furthermore, the monthly charge for electricity, for example, allows the person wishing to move into the dwelling unit to estimate an approximate cost of the per-month charge for electricity and also to gain the knowledge of individual tendencies of the charge for electricity for summer and winter.

Figure 10:
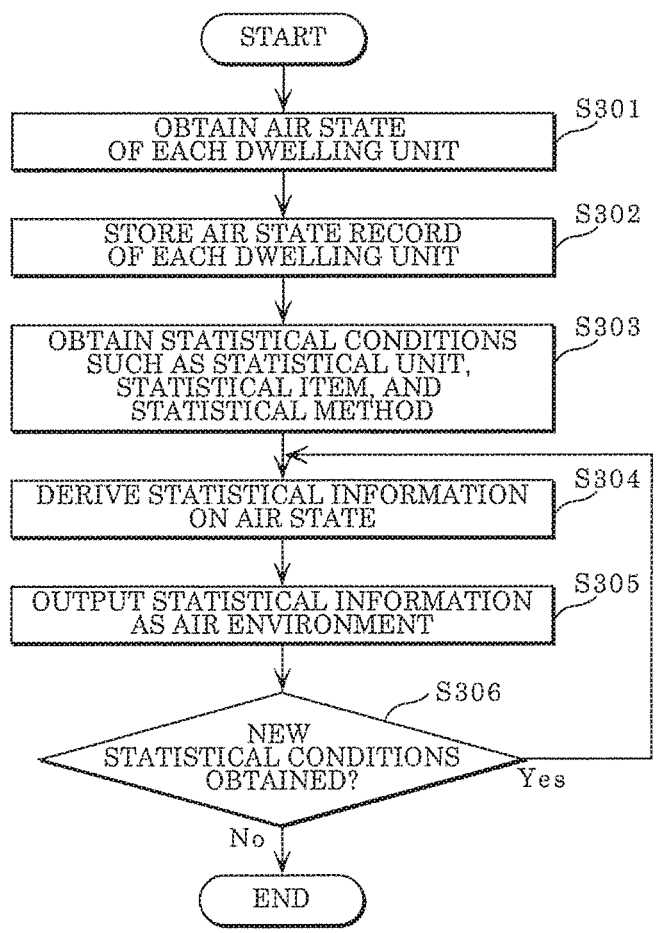
FIG. 10 is a flowchart illustrating a variation of the operation of an air information management apparatus according to an embodiment of the present invention.

FIG. 10 is a flowchart illustrating a variation of the operation illustrated in FIG. 9. Air information management apparatus 110 illustrated in FIG. 3 may perform the operation illustrated in FIG. 9.

First, obtainer 111 of air information management apparatus 110 obtains an air state of each dwelling unit from sensor 240 (S301). Next, obtainer 111 of air information management apparatus 110 stores, into storage 112, an air state record of each dwelling unit that is a record of the air state (S302).

Next, obtainer 111 of air information management apparatus 110 obtains statistical conditions such as a statistical unit, a statistical item, and a statistical method (S303). Specifically, statistical conditions are entered into inputter 117 of air information management apparatus 110, and obtainer 111 obtains the statistical conditions entered into inputter 117. Alternatively, obtainer 111 may obtain the statistical conditions from display apparatus 310 or the like via communicator 119.

The statistical unit is per day, per month, per year, per dwelling unit, per housing complex, per region, or the like. The statistical item is temperature, humidity, or the like. The statistical method is designated by the average value, the maximum value, the minimum value, the mode value, or the like. Information processor 113 of air information management apparatus 110 derives statistical information on the air state according to the statistical condition (S304). Display controller 114 of air information management apparatus 110 then outputs the statistical information as the air environment (S305).

When obtainer 111 of air information management apparatus 110 obtains new conditions (Yes in S306), information processor 113 derives statistical information on the air state according to the new statistical conditions (S304). Display controller 114 then outputs the statistical information as the air environment (S305). When no new conditions are obtained (No in S306), air information management apparatus 110 ends the operation thereof.

With this, a person wishing to move into the dwelling unit or a real estate agent can repeat the operation until appropriate statistical information is obtained. Thus, a person wishing to move into the dwelling unit or a real estate agent can find. a desired piece of real estate. Furthermore, the real estate agent can gain information for proposing the piece of real estate. Note that as in the example in FIG. 9, air information management apparatus 110 may accumulate the electricity usage and the charge for electricity, in addition to the air state, and present the electricity usage and the charge for electricity related to the air state in the example in FIG. 10 as well.

As described above, air information, air information management apparatus 110 according to the present embodiment obtains an air state of a target. area from sensor 240 installed in the target area or its surrounding area, derives statistical information on the air state, and causes display apparatus 310 to display the statistical information as information indicating an air environment in the target area. Thus, air information management apparatus 110 is capable of causing display apparatus 310 to display information indicating the air environment in the target area.

For example, air information management apparatus 110 provides the statistical information on the air state of the dwelling unit to a person wishing to move into the dwelling unit as the information indicating the air environment in the dwelling unit. With this, the person wishing to move into the dwelling unit can make an appropriate estimation of the air environment in the dwelling unit. On the basis of the appropriate estimation of the air environment, the person wishing to move into the dwelling unit can then determine whether or not to move into the dwelling unit.

Air information management apparatus 110 may collect the air state not only of a dwelling unit in a housing complex, but also of an independent house. In this case, air information management apparatus 110 provides statistical information on the air state of the independent house to a person wishing to move into the independent house. With this, the person wishing to move into the independent house can make an appropriate estimation of the air environment in the independent house. On the basis of the appropriate estimation of the air environment, the person wishing to move into the independent house can then determine whether or not to move into the independent house. Furthermore, air information management apparatus 110 may provide information indicating the air environment in other pieces of real estate different from housing.

Note that the operation of sensor 240 may be changed by energy management apparatus 220 or sensor 240 may be directly operated without using energy management apparatus 220 so that the operation of sensor 240 is changed. Sensor 240 may include an inputter for changing the operation of sensor 240. For example, in FIG. 2, the operation of each of home appliance 2111, outdoor sensor 2121, and indoor sensor 2131 may be changed by energy management apparatus 2201 or may be changed without using energy management apparatus 2201.

Energy management apparatus 220 may be omitted or gateway apparatus 230 may be omitted from the configuration of air information management system 500. Sensor 240 may directly communicate with air information management apparatus 110 or may communicate with air information management apparatus 110 via another device. Alternatively, energy management apparatus 220 and gateway apparatus 230 may be integrated.

For example, home appliance 2111, outdoor sensor 2121, and indoor sensor 2131 may communicate with air information management apparatus 110 directly or via at least one of energy management apparatus 2201, and gateway apparatus 2301.

Furthermore, the operation of each of energy management apparatus 220 and gateway apparatus 230 may be changed by air information management apparatus 110 or may be changed without using air information management apparatus 110. For example, the operation of each of energy management apparatus 220 and gateway apparatus 230 may be changed using a personal computer, a smartphone, or the like in a network inside a dwelling unit.

Furthermore, each of energy management apparatus 220 and gateway apparatus 230 may inform a resident that it cannot connect to air information management apparatus 110 when it cannot connect to air information management apparatus 110. In this case, for example, the monitor lamp included in each of energy management apparatus 220 and gateway apparatus 230 may flash.

Furthermore, in air information management apparatus 110, the time interval for collecting information such as the temperature, the humidity, and the electricity usage may be variable. Furthermore, the dwelling unit or the like from which information such as the temperature, the humidity, and the electricity usage is collected may be variable. For example, the information such as the temperature, the humidity, and the electricity usage may be collected from a plurality of dwelling units in a single housing complex, may be collected from a plurality of housing complexes, may be collected from a plurality of independent houses, or may be collected from all the plurality of housing complexes and the plurality of independent houses.

Furthermore, air information management apparatus 110 may derive the statistical information of each dwelling unit, may derive the statistical information of each housing complex, may derive the statistical information of each independent house, or may derive the statistical information of each region. This means that air information management apparatus 110 may derive the statistical information across regions. The statistical conditions including the statistical unit may be variable in air information management apparatus 110.

Furthermore, air information management apparatus 110 may analyze features such as the air environment on the basis of the record or the statistical information. Alternatively, air information management apparatus 110 may output the record or the statistical information as information for a real estate agent or a manager for the piece of real estate to analyze features such as the air environment.

Furthermore, air information management apparatus 110 may derive the statistical information by using the weather at the point in time of measurement of the temperature, the humidity, and the electricity usage. For example, the statistical information on each weather type that is sunny rainy or cloudy may be derived.

Furthermore, air information management apparatus 110 may display the statistical information at a site on the world wide web (Web). The Web site may be built in air information management apparatus 110 or may be built in another device. This means that air information management apparatus 110 may cause display apparatus 31.0 to display the statistical information via another device. Display apparatus 310 may then display the statistical information by a browser, for example.

Although the air information management apparatus according to the present invention is described. thus far based on the embodiment, the present invention is not limited to such an embodiment. Embodiments resulting from various modifications of the embodiment that may be conceived by a person having ordinary skill in the art as well as other embodiments resulting from arbitrary combinations of structural elements of the embodiments are intended to be included within the scope of the present invention.

For example, processes executed by a specific processing unit may be performed by a different processing unit. Furthermore, the order in which processes are performed may be changed, or a plurality of processes may be performed in parallel. The air information management apparatus may be expressed as a weather information management apparatus or a management apparatus.

The present invention can be implemented not only as the air information management apparatus, but also as a method inc .ding steps (processes) which the structural elements included in the air information management apparatus perform. For example, such steps are executed by a computer. Moreover, the present invention can be implemented as a program for causing a computer to execute the steps included in the method. In addition, the present invention can be implemented as a non-transitory, computer-readable recording medium, such as a CD-ROM, on which such a program is recorded.

For example, when the present invention is implemented as a program (software), the respective steps may he performed by executing the program using hardware such as a central processing unit (CPU), memory, and an input and output circuit of the computer. In other words, the CPU obtains data from the memory, the input and output circuit, or the like, computes the data, and outputs the computed result to the memory, the input and output circuit, or the like so that the respective steps are performed.

Moreover, the structural elements included in the air information management apparatus may each be implemented as a specialized or general-purpose circuit. These structural elements may be implemented as a single circuit or may be implemented as more than one circuit.

Moreover, the structural elements included in the air information management apparatus may be implemented as large scale integration (LSI), which is an integrated circuit (IC). These structural elements ay be integrated into individual chips, or a portion or all of the structural elements may be integrated into a single chip. The LSI may be referred to as system LSI, super LSI, or ultra LSI depending on the number of elements per chip.

Moreover, the integrated circuit is not limited to LSI and may be implemented as a specialized circuit or a general-purpose processor. A field programmable gate array (FPGA) or a reconfigurable processor that allows reconfiguration of the connection or configuration of the inner circuit cells of the LSI circuit can be used for the same purpose.

Furthermore, when advancement in semiconductor technology and derivatives of other technologies brings forth a circuit integration technology which replaces LSI, it will be appreciated that such a circuit integration technology may be used to integrate the structural elements included in the air information management apparatus.

The invention claimed is:

1. An air information management apparatus, comprising:
an obtaining circuit that obtains a plurality of air states respectively measured during a plurality of periods from a sensor installed in a second dwelling in surroundings of a target area that is a first dwelling;
an information processing circuit that derives statistical information on the plurality of air states from the plurality of air states, and selects from among a plurality of recommendations a recommendation for use of the target area in accordance with the statistical information; and
a display control circuit that causes a display apparatus to display the statistical information derived by the information processing circuit and the recommendation selected by the information processing circuit,
wherein the statistical information includes at least one of a total number of times a predetermined event related to the plurality of air states occurs and an average value of the plurality of air states.

2. The air information management apparatus according to claim 1, wherein the recommendation selected includes at least one of a building type and a building floor plan that are recommended for use of the target area.

3. The air information management apparatus according to claim 1,
wherein the information processing circuit further determines a property price using a price parameter selected from among a plurality of price parameters in accordance with the statistical information, and
the display control circuit further causes the display apparatus to display the property price determined by the information processing circuit.

4. The air information management apparatus according to claim 1,
wherein the obtaining circuit further obtains an electricity usage for the target area or the area surrounding the target area,
the information processing circuit further derives, from the electricity usage obtained by the obtaining circuit, an electricity usage related to the plurality of air states, and
the display control circuit further causes the display apparatus to display the electricity usage derived by the information processing circuit.

5. An air information management method, comprising:
obtaining a plurality of air states respectively measured during a plurality of periods from a sensor installed in a second dwelling in surroundings of a target area that is a first dwelling;
deriving statistical information on the plurality of air states from the plurality of air states, and selecting from among a plurality of recommendations a recommendation for use of the target area in accordance with the statistical information; and
outputting the statistical information derived and the recommendation selected, to a display apparatus,
wherein the statistical information includes at least one of a total number of times a predetermined event related to the plurality of air states occurs and an average value of the plurality of air states.

* * * * *